US006822857B2

(12) United States Patent
Jung et al.

(10) Patent No.: US 6,822,857 B2
(45) Date of Patent: Nov. 23, 2004

(54) MONITOR IMPROVED IN A TILTING STRUCTURE

(75) Inventors: Hyun-Jun Jung, Suwon (KR); Jun-Soo Jeong, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 10/401,776

(22) Filed: Mar. 31, 2003

(65) Prior Publication Data

US 2004/0012917 A1 Jan. 22, 2004

(30) Foreign Application Priority Data

Jul. 16, 2002 (KR) ........................................ 2002-41617

(51) Int. Cl.[7] ................................................ G06F 1/16
(52) U.S. Cl. .................... 361/681; 361/680; 312/223.2; 248/920
(58) Field of Search ............................... 361/679–687, 361/724–727; 312/223.1–223.6; 395/169, 905; 248/917–924; 345/156

(56) References Cited

U.S. PATENT DOCUMENTS

| | | | |
|---|---|---|---|
| 5,835,342 A | 11/1998 | Hunte | 361/681 |
| 6,018,847 A | 2/2000 | Lu | 16/337 |
| 6,233,138 B1 | 5/2001 | Osgood | 361/681 |
| 6,430,038 B1 * | 8/2002 | Helot et al. | 361/681 |
| 6,680,843 B2 * | 1/2004 | Farrow et al. | 361/681 |
| 2003/0142474 A1 * | 7/2003 | Karidis et al. | 361/683 |

FOREIGN PATENT DOCUMENTS

| | | |
|---|---|---|
| JP | 2001-50244 | 2/2001 |
| KR | 20-178710 | 2/2000 |
| KR | 20-191805 | 5/2000 |
| KR | 2001-35722 | 5/2001 |
| KR | 20-253576 | 10/2001 |

* cited by examiner

*Primary Examiner*—Hung Van Duong
(74) *Attorney, Agent, or Firm*—Staas & Halsey LLP

(57) ABSTRACT

A monitor including a monitor main body to display a picture thereon, and a base member to support the monitor main body. The monitor includes a link member having upper and lower ends rotatably combined to a main hinge provided in the monitor main body and a base hinge provided in the base member, respectively. The monitor also includes an auxiliary link member to connect the main and base hinges, and disposed in parallel with the link member, being eccentric with the monitor hinge and the base hinge, a main bracket interposed between the monitor main body and the link member, and a pivot part to pivot the monitor main body upon the main bracket. Accordingly, the present invention provides a monitor in which a monitor main body is controlled in tilt, planar rotation, and height, thus, maintaining tilt regardless of the height control.

51 Claims, 13 Drawing Sheets

MONITOR IMPROVED IN A TILTING STRUCTURE

CROSS-REFERENCE TO RELATED APPLICATION

This application claims the benefit of Korean Application No. 2002-41617, filed Jul. 16, 2002, in the Korean Intellectual Property Office, the disclosure of which is incorporated herein by reference.

BACKGROUND OF THE INVENTION

1. Field of the Invention

The present invention relates to a monitor, and more particularly, to a monitor improved in a pivoting and tilting structure between a monitor main body and a base member.

2. Description of the Related Art

As shown in FIG. 1, a conventional monitor includes a base member 201 seated on a horizontal plane such as a desk, etc., a monitor main body 202 to display a picture thereon, and a link member 210 to link the monitor main body 202 with the base member 201.

The link member 210 has a lower end supported by a pair of base brackets 204 and 206 fastened to the base member 201, to rotate in a forward and backward direction, and an upper end incorporated with the monitor main body 202.

Therefore, the link member 210 may be tilted against the base member 201 in an upward and downward direction, but the monitor main body 202 cannot be tilted against the link member 210. Thus, in the conventional monitor, the monitor main body may be controlled in height variation but not in a tilt direction.

Contrary to FIG. 1, there is a monitor in which the link member has a lower end incorporated with the base member, and an upper end rotatably combined to the monitor main body. Thus, in this conventional-type monitor, the monitor main body may be controlled in tilt but not in height.

As computer usage is rapidly spreading, use of the monitor is also rapidly increasing in demand. Thus, to meet various user's tastes, there has been proposed a monitor which includes a monitor main body pivoted on a link member (i.e., capable of planar rotation), and an arm stand which is manufactured separately from the monitor and employed to support the monitor. Herein, a combining structure of such separately manufactured monitor and arm stand is regulated by VESA (Video Electronic Standard Association).

As described above, the conventional monitor is inconvenient for the user to control the monitor main body in its tilt, planar rotation, and height altogether. Further, the conventional monitor is not designed to be folded up. Thus, the conventional monitor is too bulky to store and carry.

Also, in the conventional monitor, the base member is designed to be installed only on a horizontal plane. Thus, it is impossible to install the conventional monitor on an inclined plane such as a wall, the arm stand, etc.

SUMMARY OF THE INVENTION

Accordingly, it is an aspect of the present invention to provide a monitor in which a monitor main body is controlled in tilt, planar rotation, and height, thus, maintaining the tilt regardless of the height control.

Another aspect of the present invention is to provide a monitor which properly adjusts a tilting angle of a monitor main body against a base member, and decreases costs to store and carry the monitor by decreasing the packing volume thereof.

Another aspect of the present invention is to provide a monitor in which a base member is installed onto an inclined plane such as a wall, an arm stand, etc., and more particularly, to provide a monitor which is easily installed onto various arm stands according to VESA.

Additional aspects and advantages of the invention will be set forth in part in the description which follows and, in part, will be obvious from the description, or may be learned by practice of the invention.

The foregoing and/or other aspects of the present invention are achieved by providing a monitor including a monitor main body to display a picture thereon, and a base member to support the monitor main body. The monitor includes a link member having upper and lower ends rotatably combined to a main hinge provided in the monitor main body and a base hinge provided in the base member, respectively. The monitor also includes an auxiliary link member to connect the main and base hinges and disposed in parallel with the link member, being eccentric with the main hinge and the base hinge. The monitor includes a main bracket interposed between the monitor main body and the link member, and a pivot part to pivot the monitor main body upon the main bracket.

According to an aspect of the invention, the monitor further includes a monitor bracket detachably combined to the monitor main body between the monitor main body and the main bracket.

According to an aspect of the invention, the pivot part connects the monitor bracket upon the main bracket.

According to another aspect of the invention, the pivot part includes a first through hole formed through the main bracket, a second through hole formed through the monitor bracket, at least one washer provided between the first and second through holes, and a rivet inserted through the first and second through holes to make the main and monitor brackets pivot each other with a predetermined friction. The rivet is provided with a cable through hole through which a cable electrically connecting the monitor main body and the base member passes.

According to an aspect of the invention, the pivot part includes a pivoting angle restricting part to restrict a pivoting angle of the monitor bracket on the main bracket.

According to an aspect of the invention, the pivoting angle restricting part includes a pivot projection provided adjacent to one of the first and second through holes. The pivoting angle restricting part includes a guiding slot shaped like an arc, formed adjacent to the other one of the first and second through holes, to accommodate and guide the pivot projection to restrict sliding of the pivot projection.

According to yet another aspect of the invention, the monitor bracket is formed with at least one through hole to be combined to the monitor main body, and a rear of the monitor main body is formed with at least one screw hole in correspondence to the through hole of the monitor bracket.

According to an aspect of the invention, the through holes of the monitor bracket and the screw holes of the monitor main body are designed according to VESA.

According to an aspect of the invention, the monitor bracket is formed with at least one first hook extended from an edge of the monitor bracket to be easily deposited on a rear of the monitor main body, and the rear of the monitor main body is formed with at least one first hook holder in correspondence to the first hook of the monitor bracket.

According to another aspect of the invention, the monitor further includes a base bracket combined to the base member to install the base member onto an inclined plane. The base bracket is provided with at least one second hook engaged with at least one second hook holder provided on the base member to be easily deposited on a rear of the base member.

According to an aspect of the invention, the base bracket is provided with at least one first combining hole to combine the base bracket with the inclined plane.

According to an aspect of the invention, the base bracket is provided with at least one second combining hole to combine the base bracket with the base member, and the base member is provided with at least one third combining hole in correspondence to the second combining hole of the base bracket.

According to an aspect of the invention, the second combining hole of the base bracket and the third combining hole of the base member are designed according to VESA.

According to yet another aspect of the invention, the monitor further comprises a pair of first and second supporting brackets spaced from each other at a predetermined distance and fastened onto the base member. The base hinge includes first and second base hinge parts to rotatably combine opposite sides of the lower end of the link member to the first and second supporting brackets, respectively.

According to another aspect of the invention, the first base hinge part includes a first pin accommodating part formed on a first side of the lower end of the link member, a first pin supporting part formed inside the first supporting bracket, and a first hinge pin having a first end rotatably inserted in the first pin accommodating part and a second end fitted into the first pin supporting part. The first base hinge part also includes a first frictional spring interposed between the first hinge pin accommodating part and the first hinge pin, and having a force resisting rotation of the first hinge pin.

According to an aspect of the invention, the first supporting bracket includes a spring supporting part to protrude inwardly. On the spring supporting part is provided a torsion spring having an elasticity to act in an opposite direction to a downward rotation of the link member against the base member.

According to another aspect of the invention, the second base hinge part includes a second pin accommodating part formed on a second side of the lower end of the link member, a second pin supporting part formed inside the second supporting bracket, a second hinge pin having a first end rotatably inserted in the second pin accommodating part and a second end fitted into the second pin supporting part, and a first link supporting part incorporated with the second end of the second hinge pin.

According to an aspect of the invention, at least one of the first and second base hinge parts is provided with a rotating angle restricting part to restrict a rotating angle of the link member against the base member within a predetermined range.

According to an aspect of the invention, the rotating angle restricting part includes a pair of fan shaped grooves formed on the second side of the lower end of the link member, around the second pin accommodating part, to be opposite each other. The rotating restricting part also includes a pair of stoppers provided around the second pin supporting part of the second supporting bracket, and selectively engaged with the pair of fan shaped groove according to a rotating direction of the link member.

According to an aspect of the invention, the monitor further includes a pair of third and fourth supporting brackets spaced from each other at a predetermined distance and fastened onto the main bracket. The main hinge includes first and second main hinge parts to rotatably combine opposite sides of the upper end of the link member to the third and fourth supporting brackets, respectively.

According to yet another aspect of the invention, the first main hinge part includes a third pin supporting part formed on a first side of the upper end of the link member, a third hinge pin having a first end fitted into the third pin supporting part, and a second frictional spring incorporated with the third supporting bracket and to rotatably accommodate a second end of the third hinge pin therein, with a force resisting rotation of the third hinge pin.

According to an aspect of the invention, the second main hinge part includes a third pin accommodating part formed on a second side of the upper end of the link member, a second link supporting part provided between the opposite sides of the upper end of the link member, and a fourth hinge pin having a first end incorporated with the second link supporting part and rotatably inserted in the third pin accommodating part. The second main hinge part also includes a third frictional spring incorporated with the fourth supporting bracket and to rotatably accommodate a second end of the fourth hinge pin therein, with a force resisting rotation of the fourth hinge pin.

According to an aspect of the invention, the second main hinge part includes a tilting angle restricting part to restrict a tilting angle of the monitor main body against the link member within a predetermined range.

According to an aspect of the invention, the tilting angle restricting part includes an arc cutting part formed on the fourth supporting bracket adjacent to the third frictional spring, a tilting restricting washer formed with a washer through hole and fixedly fitted on the fourth hinge pin, and a projection selectively engaged with opposite ends of the arc cutting part according to a tilting direction of the monitor main body.

According to an aspect of the invention, the auxiliary link member is provided in pairs and is rotatably combined to the first and second link supporting parts.

According to an aspect of the invention, the first and second link supporting parts are provided with a plurality of pin holes spaced from each other at a predetermined distance. Opposite ends of the auxiliary link members are provided with pin through holes to be aligned with the pin holes.

According to another aspect of the invention, a plurality of link coupling pins is inserted through the pin holes of the first and second link supporting parts and the pin through holes of the auxiliary members to couple the auxiliary link members with the first and second link supporting parts.

BRIEF DESCRIPTION OF THE DRAWINGS

The above and/or other aspects and advantages of the present invention will become apparent and more appreciated from the following description of the preferred embodiments, taken in conjunction with the accompany drawings of which.

DETAILED DESCRIPTION OF THE PREFERRED EMBODIMENTS

Figure 1:
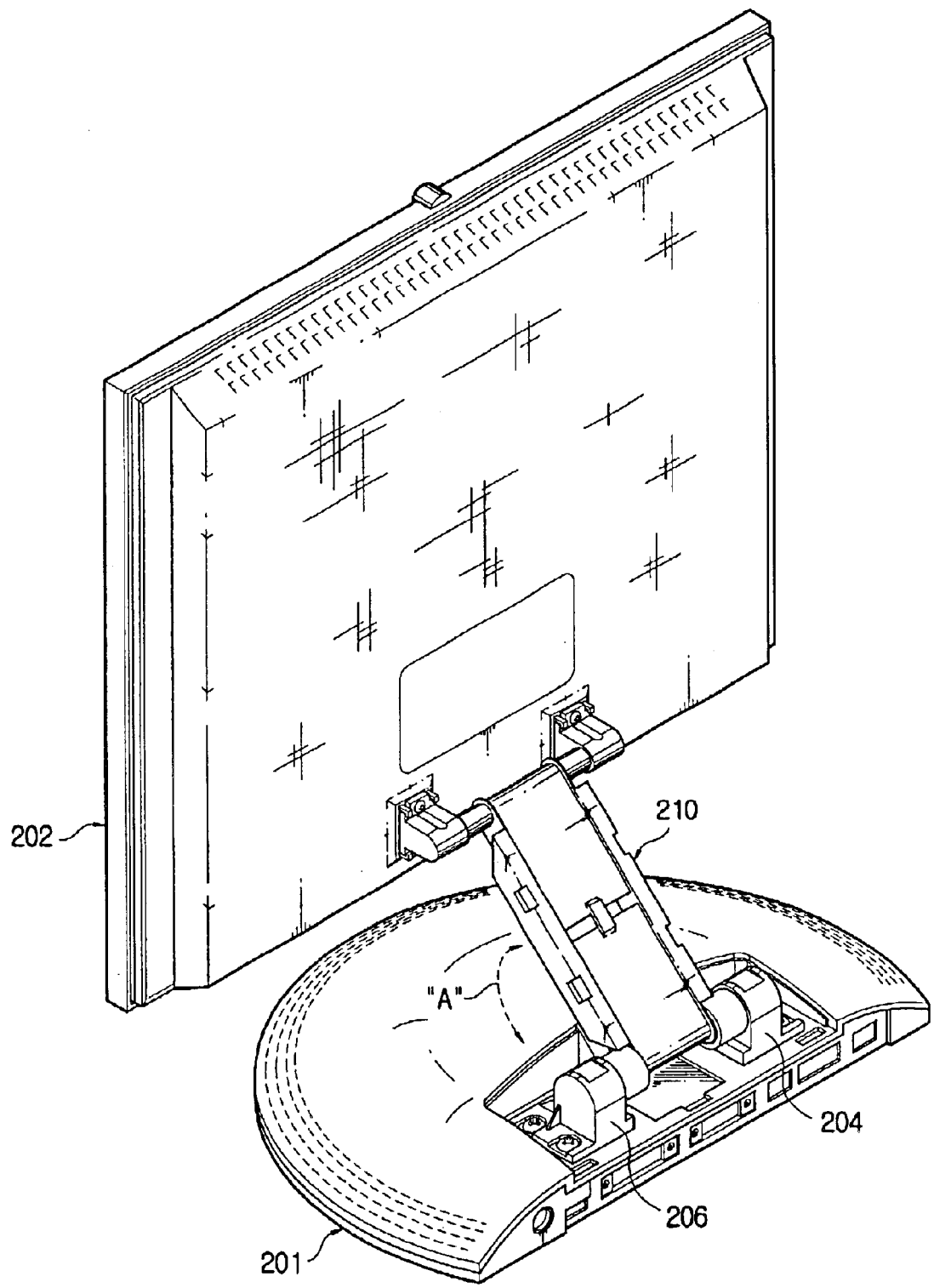
FIG. 1 is a rear perspective view of a conventional monitor.

Reference will now be made in detail to the present preferred embodiments of the present invention, examples of which are illustrated in the accompanying drawings, wherein like reference numerals refer to like elements throughout.

Generally, a monitor includes a monitor main body provided with a screen displaying a picture thereon, and a base member seated on an installation plane such as a desk, a wall, etc., to support the monitor main body. Recently, in order to make the monitor main body have a large-sized displaying area as well as a thin body, the screen of the monitor main body has been manufactured with an LCD (liquid crystal display), etc.

Hereinafter, a monitor including the monitor main body manufactured with an LCD panel will be described by way of example.

Figure 2:
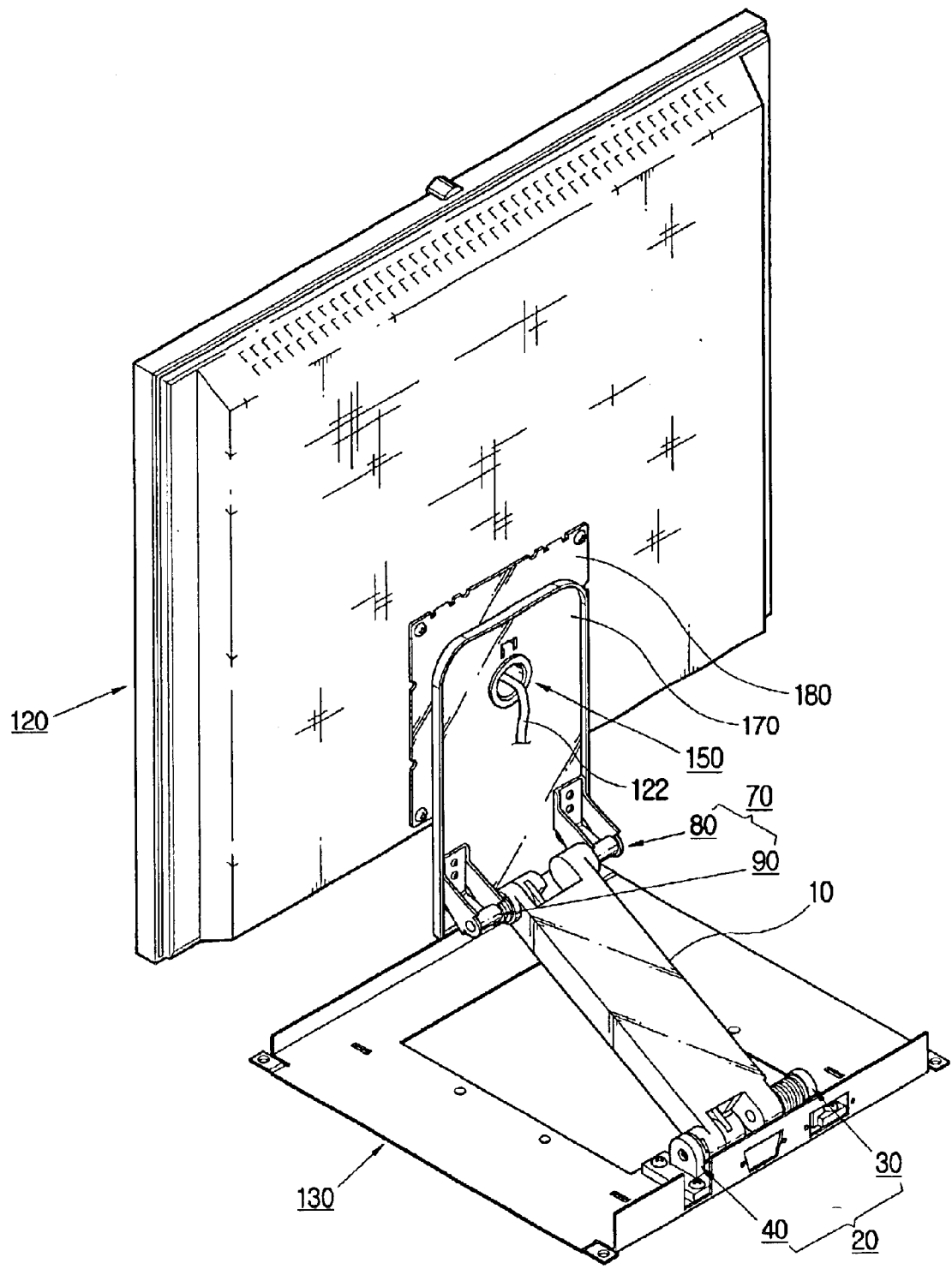
FIG. 2 is a rear perspective view of a monitor, according to an embodiment of the present invention.
Figure 3:
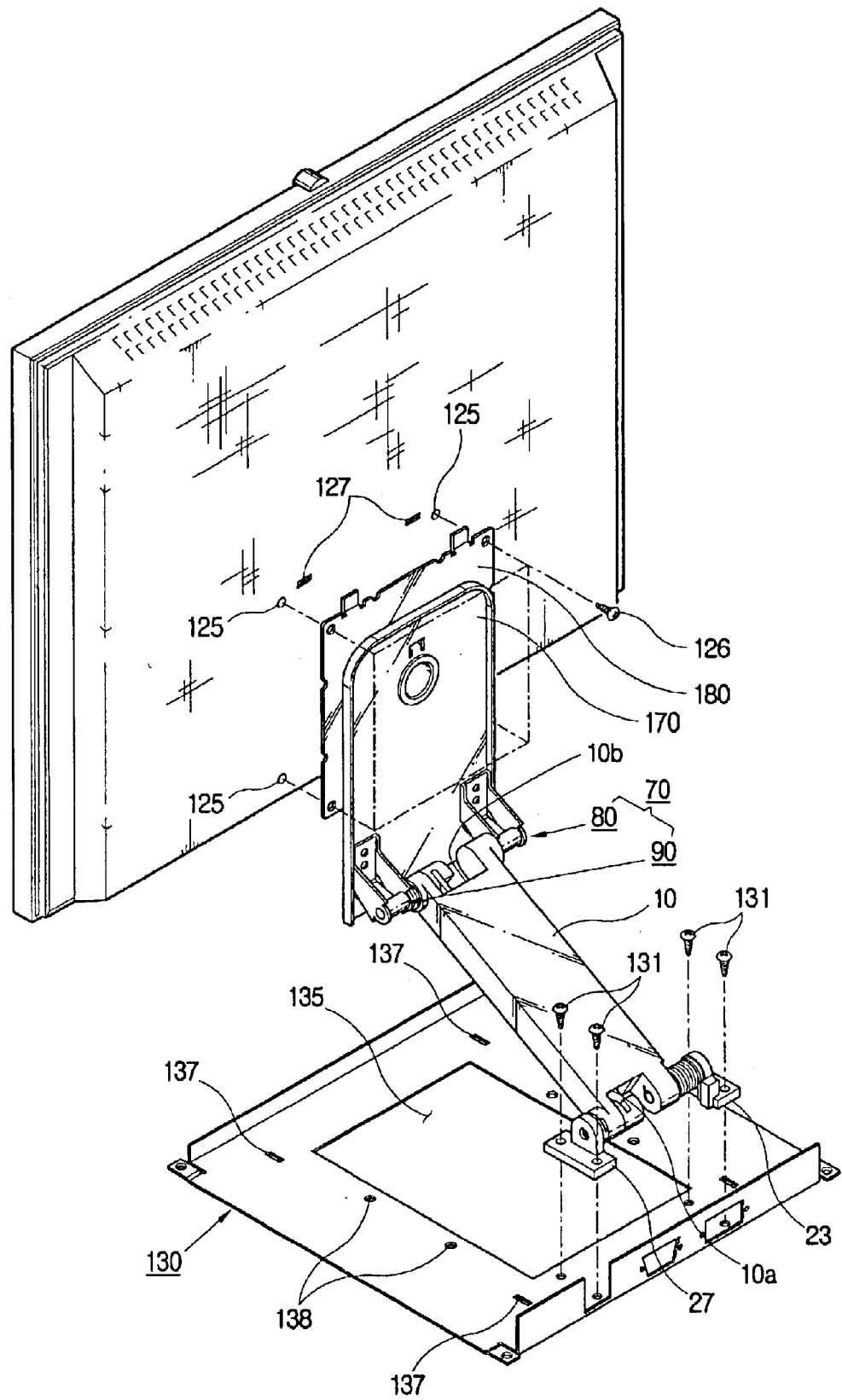
FIG. 3 is a partially exploded perspective view of the monitor of FIG. 2.

As shown in FIGS. 2 and 3, a monitor according to the present invention includes a monitor main body 120 to display a picture thereon, a base member 130 seated on an installation plane such as a desk, a wall, etc., a link member 10 to link the monitor main body 120 with the base member 130, and a main bracket 170 disposed between the monitor main body 120 and the link member 10. The monitor also includes a pivot part 150 to pivot the monitor main body 120 upon the main bracket 170, and a monitor bracket 180 detachably combined to the monitor main body 120 between the monitor main body 120 and the main bracket 170.

Figure 4:
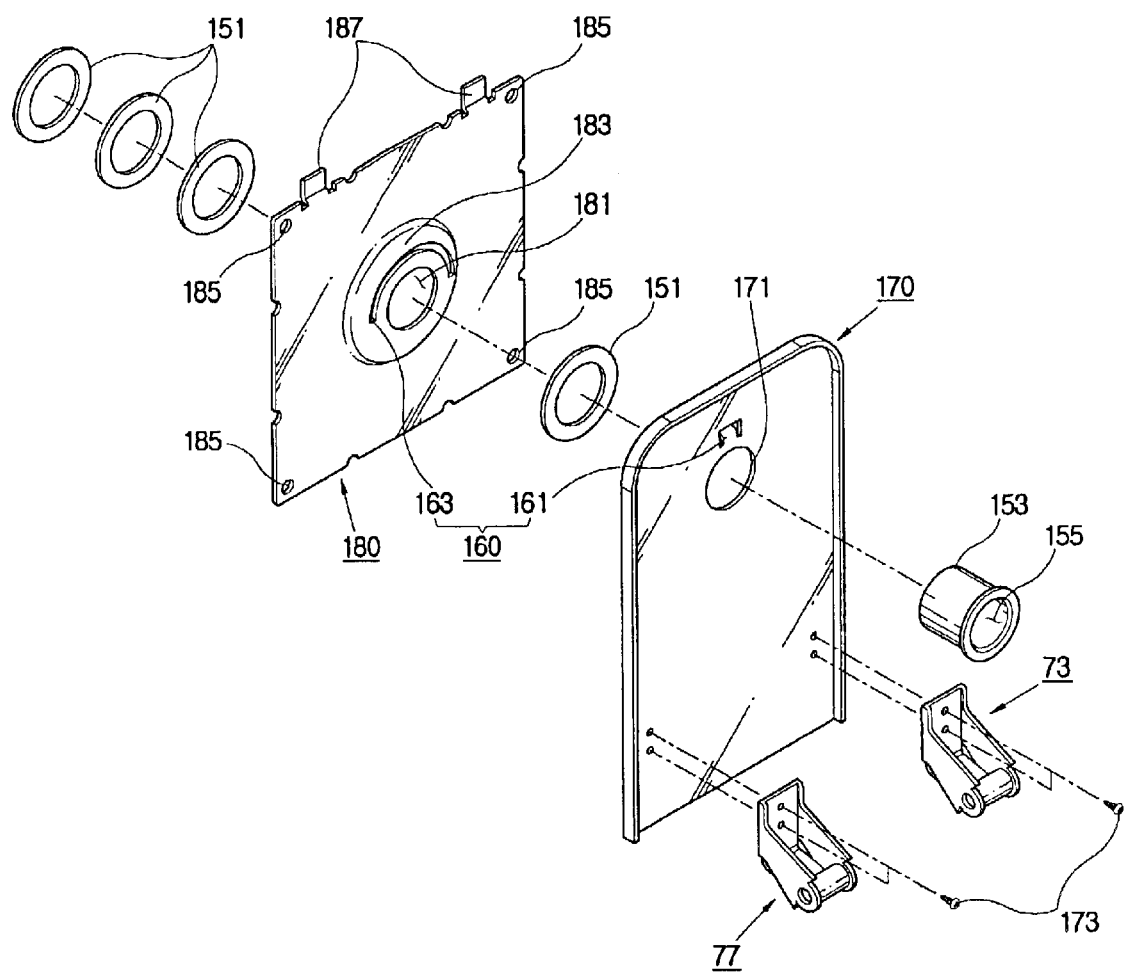
FIG. 4 is an exploded perspective view of a pivot part in FIG. 3.

As shown in FIG. 4, the pivot part 150 to pivot the monitor main body 120 upon the main bracket 170 includes a first through hole 171 formed through the main bracket 170, a second through hole 181 formed through the monitor bracket 180, a plurality of washers 151 aligned with the first and second through holes 171 and 181, and a rivet 153 inserted through the first and second through holes 171 and 181 in the main and monitor brackets 170 and 180 to make the main and monitor brackets 170 and 180 pivot against each other with predetermined friction.

The first through hole 171 of the main bracket 170 has a circular shape, and the second through hole 181 of the monitor bracket 180 has a circular shape corresponding to the first through hole 171. The second through hole 181 is formed on a protruded part 183 to protrude from a center of the monitor bracket 180 toward the main bracket 170.

The rivet 153 is inserted through the first and second through holes 171 and 181 and the plurality of washers 151, and then hammered so as to make the monitor bracket 180 and the main bracket 170 pivot against each other with a predetermined friction. Herein, the washers 151 serve as a flat spring, thereby keeping the friction acting between the main bracket 170 and the monitor bracket 180 constant. Further, the rivet 153 has a cable through hole 155 through which a cable 122 to electrically connect the monitor main body 120 and the base member 130 passes.

The pivot part 150 further includes a pivoting angle restricting part 160 to restrict a pivoting angle of the monitor bracket 180 pivoted on the main bracket 170.

The pivoting angle restricting part 160 includes a pivot projection 161 to protrude from a surface of the main bracket 170 adjacent to the first through hole 171, and a guiding slot 163 shaped like an arc, formed on a surface of the monitor bracket 180 adjacent to the second through hole 181. The guiding slot 163 accommodates and guides the pivot projection 161 so as to restrict sliding of the pivot projection 161.

The pivot projection 161 is formed by partially cutting a part of the main bracket 170 adjacent to the first through hole 171 and then bending it. The guiding slot 163 is formed on the monitor bracket 180 with an arc shape to be coaxial with and spaced from the second through hole 181. The guiding slot 163 accommodates the pivot projection 161, so that the pivoting angle of the pivot projection 161 is restricted within the guiding slot 163. In the present invention, a pivoting angle of the monitor main body 120 is restricted within an angle of 180° from left to right (refer to FIGS. 6A and 6B). However, the pivoting angle may be suitably adjusted as necessary.

The pivot projection 161 is provided on the main bracket 170, and the guiding slot 163 is provided on the monitor bracket 180. However, the pivot projection 161 may be provided on the monitor bracket 180, and the guiding slot 163 may be provided on the main bracket 170.

The monitor bracket 180 is formed with a plurality of through holes 185 at its corners so as to be combined to the monitor main body 120, and a rear of the monitor main body 120 is formed with a plurality of screw holes 125 in correspondence to the through holes 185 of the monitor bracket 180. Thus, the monitor main body 120 is combined to the monitor bracket 180 with a plurality of first screws 126. Herein, the through holes 185 of the monitor bracket 180 and the screw holes 125 of the monitor main body 120 are designed according to the VESA, so that a user may combine various monitor main bodies according to the VESA to the monitor bracket 180.

Further, the monitor bracket 180 is formed with a pair of first hooks 187 extended from an upper edge of the monitor bracket 180 so as to easily deposit the monitor bracket 180 on the rear of the monitor main body 120. The rear of the monitor main body 120 is formed with a pair of first hook holders 127 in correspondence to the first hooks 187 of the monitor bracket 180. That is, the first hooks 187 and the first hook holders 127 are employed to easily deposit the monitor main body 120 on the monitor bracket 180, and to reinforce a combination of the through holes 185 of the monitor bracket 180 and the screw holes 125 of the monitor main body 120.

The monitor main body 120 is combined to the monitor bracket 180, and the monitor bracket 180 is pivoted upon the main bracket 170. However, the monitor main body 120 may be directly combined to and pivoted upon the main bracket 170.

Figure 6A:
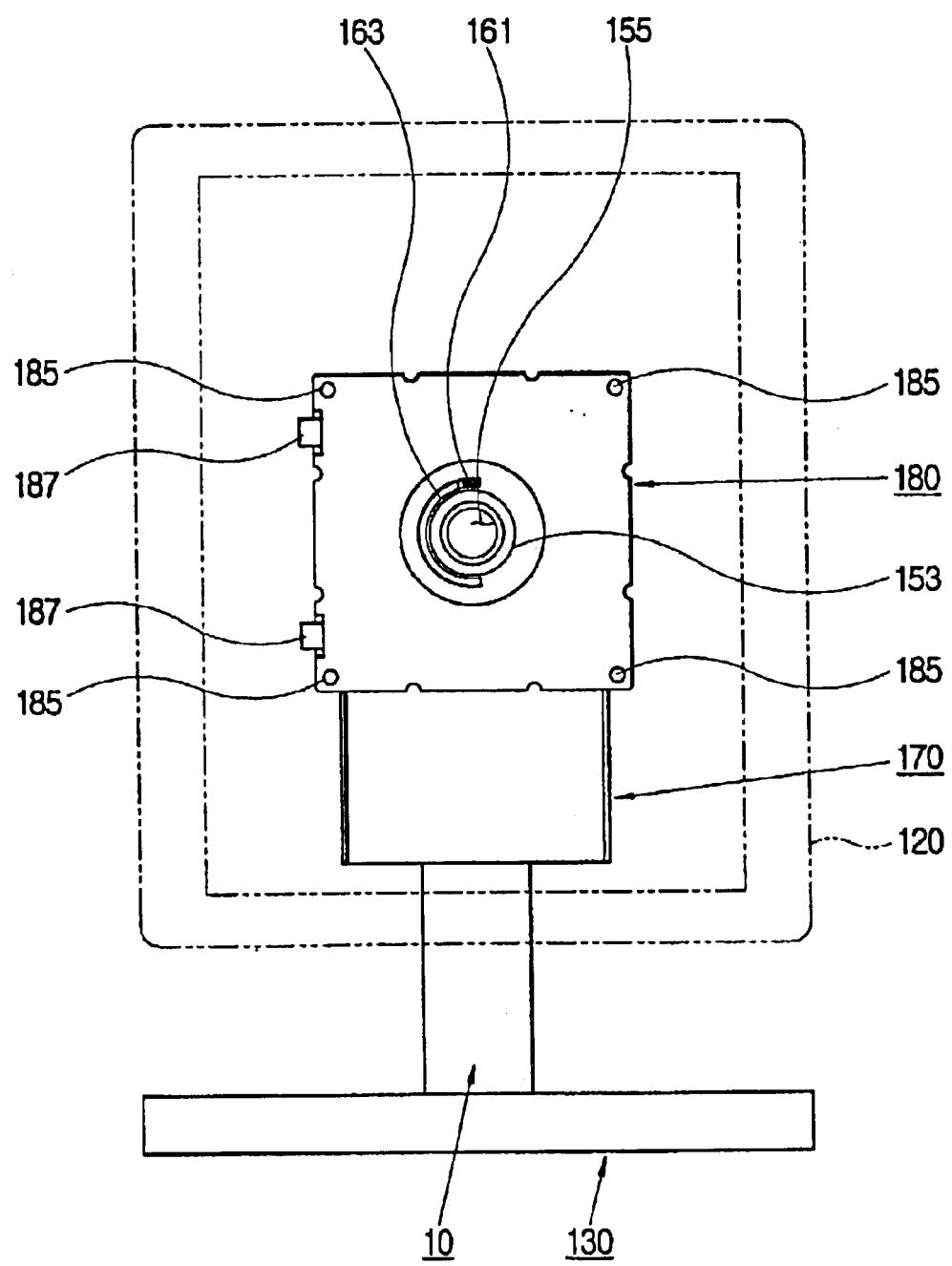
FIGS. 6A and 6B illustrate a planar rotation of a monitor main body in the monitor of FIG. 2.
Figure 6B:
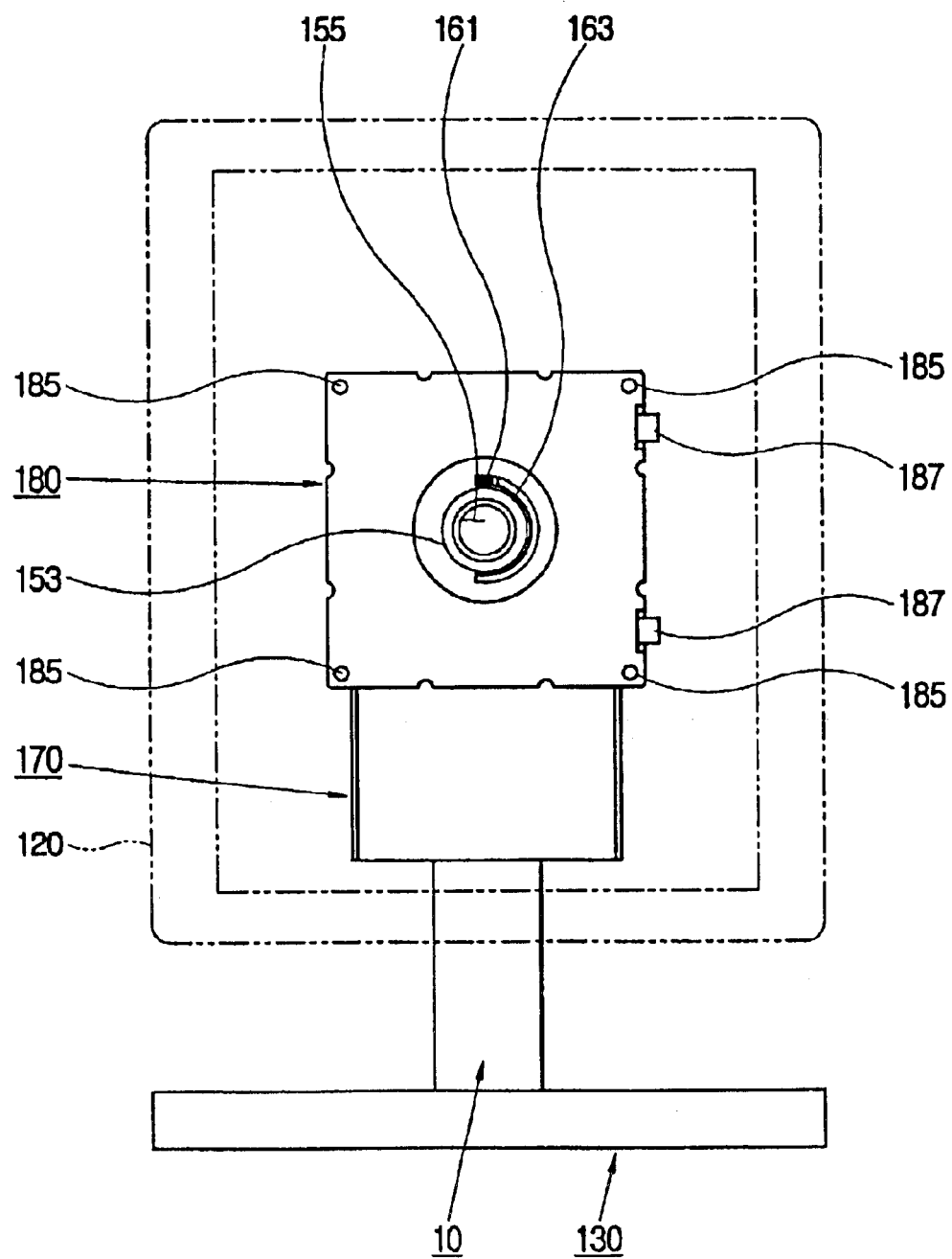

With the above configuration, the planar rotation of the monitor main body 120 pivoted upon the main bracket 170 combined to the link member 10 is made as follows. As shown in FIGS. 6A and 6B, the rear of the monitor main body 120 is combined to the monitor bracket 180, and the monitor bracket 180 is pivoted upon the main bracket 170 by the pivot part 150, thereby pivoting the monitor main body 120 upon the main bracket 170. Herein, the planar rotation of the monitor main body 120 is restricted by the pivoting angle restricting part 160, so that the monitor main body 120 may be planar-rotated in a left direction by an angle of 90° (refer to FIG. 6A), and in a right direction by an angle of 90° (refer to FIG. 6B). Further, the cable 122 electrically connects the monitor main body 120 and the base member 130 through the cable through hole 155 provided in the rivet 153.

Figure 5:
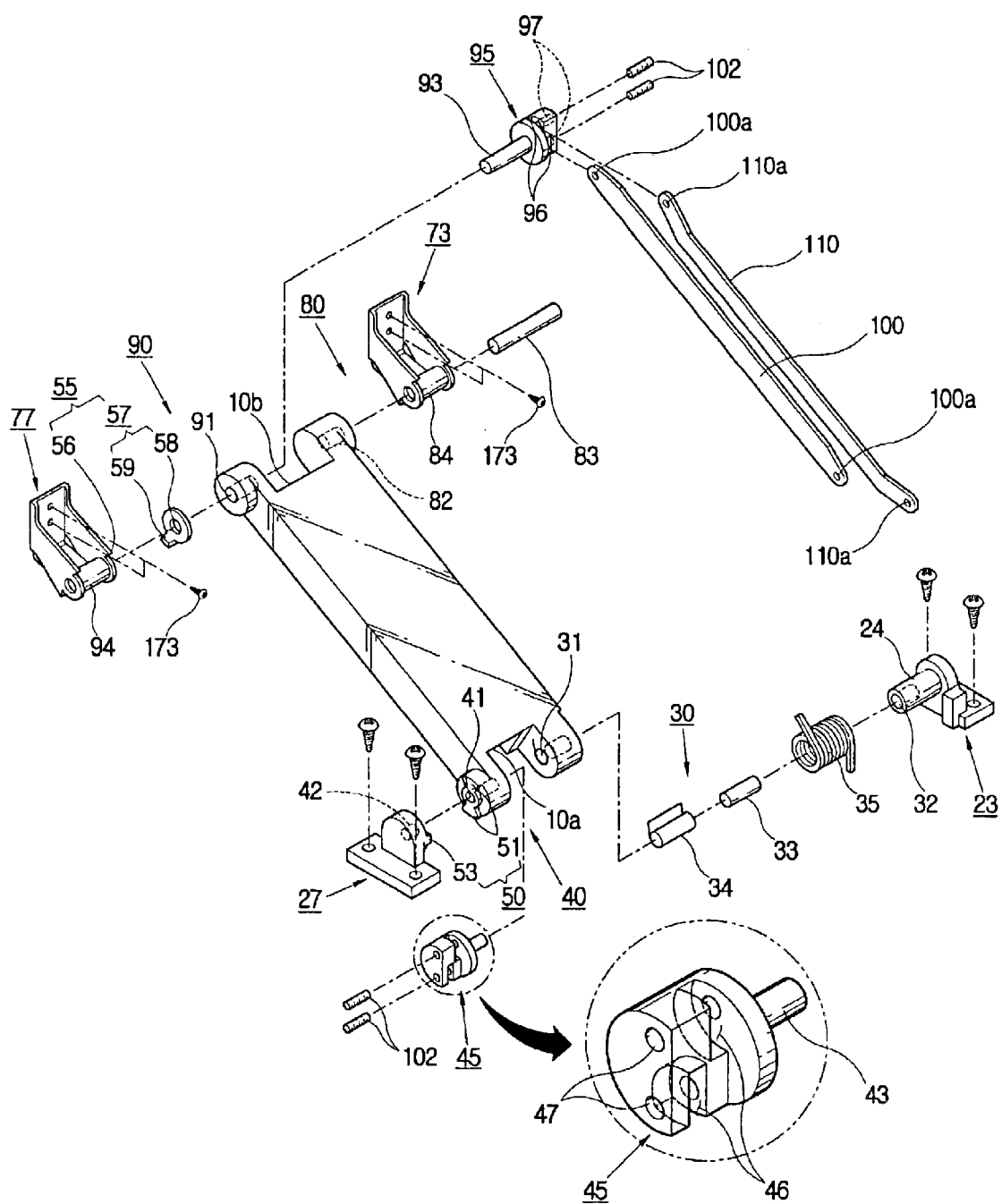
FIG. 5 is an exploded perspective view of a main hinge and a base hinge in FIG. 3.

As shown in FIGS. 2, 3 and 5, the link member 10 has a lower end 10a rotatably combined to a base hinge 20 of the base member 130, and an upper end 10b rotatably combined to a main hinge 70 of the main bracket 170 combined to the monitor main body 120. Further, there are provided a pair of first and second supporting brackets 23 and 27 spaced from each other at a predetermined distance and fastened onto the base member 130 with second screws 131, and a pair of third and fourth supporting brackets 73 and 77 spaced from each other at a predetermined distance and fastened onto the main bracket 170 with third screws 173.

The base member 130 is formed with a link member accommodating part 135 at a center thereof so as to accommodate the link member 10.

The base hinge 20 includes first and second base hinge parts 30 and 40 to rotatably combine opposite sides of the lower end 10a of the link member 10 to the first and second supporting brackets 23 and 27, respectively.

The first base hinge part 30 includes a first pin accommodating part 31 formed on a first side of the lower end 10a of the link member 10, a first pin supporting part 32 formed inside the first supporting bracket 23, and a first hinge pin 33 having a first end rotatably inserted in the first pin accommodating part 31 and a second end fixedly fitted into the first pin supporting part 32. The first base hinge part 30 also includes a first frictional spring 34 interposed between the first hinge pin accommodating part 31 and the first hinge pin 33, and having a force resisting rotation of the first hinge pin 33.

The first frictional spring 34 is shaped like a flat spring and has a first end to which the first hinge pin 33 is fixedly fitted, and a second end combined to the first pin accommodating part 31. Thus, the first frictional spring 34 fastened to the link member 10 is rotatably combined to the first hinge pin 33 fastened to the first supporting bracket 23 with a predetermined friction. Herein, it is preferable that the friction is stronger than torque due to a weight of the monitor main body 120.

The first supporting bracket 23 includes a spring supporting part 24 to protrude inwardly, and on the spring supporting part 24 is provided a torsion spring 35 having an elasticity to act in an opposite direction to a downward rotation of the link member 10 against the base member 130.

The torsion spring 35 has a first end supported by the first supporting bracket 23, and a second end supported by the link member 10, thereby causing a force acting in an opposite direction to a forward rotation of the monitor main body 10 linked to the link member 10. Herein, it is preferable that the elasticity of the torsion spring 35 is approximately equal to the torque due to the weight of the monitor main body 120. Thus, because the weight of the monitor main body 120 and the elasticity of the torsion spring 35 offset each other, the user may easily rotate the link member 10 against the base member 130 with a small force. That is, when the link member 10 is rotated against the base member 130 forward and backward, there is needed only a force strong enough to overcome the friction between the first frictional spring 34 and the first hinge pin 33, so that the user may easily rotate the link member 10 against the base member 130 forward and backward with a small force, regardless of the forward and backward direction.

The second base hinge part 40 includes a second pin accommodating part 41 formed on a second side of the lower end 10a of the link member 10, a second pin supporting part 42 formed inside the second supporting bracket 27, and a second hinge pin 43 having a first end rotatably inserted in the second pin accommodating part 41 and a second end fixedly fitted into the second pin supporting part 42. The second base hinge part 40 also includes a first link supporting part 45 incorporated with the second end of the second hinge pin 43.

The first link supporting part 45 is provided between the opposite sides of the lower end 10a of the link member 10, and incorporated with the second end of the second hinge pin 43 fitted into the second pin supporting part 42 of the second supporting bracket 27. Thus, the first link supporting part 45 incorporated with the second hinge pin 43 is fixedly fitted into the second supporting bracket 27, and the second hinge pin 43 is rotatably inserted into the second pin accommodating part 41.

The second base hinge part 40 is provided with a rotating angle restricting part 50 to restrict a rotating angle of the link member 10 against the base member 130 within a predetermined range.

The rotating angle restricting part 50 includes a pair of fan shaped grooves 51 and a pair of stoppers 53. Herein, the pair of fan shaped grooves 51 is formed on an outside of the second side of the lower end 10a of the link member 10, around the second pin accommodating part 41, to be opposite each other. The pair of stoppers 53 is provided around the second pin supporting part 42 of the second supporting bracket 27, and is selectively engaged with the pair of fan shaped grooves 51 according to the rotating direction of the link member 10. Thus, the rotating angle of the link member 10 against the base member 130 is restricted within a predetermined angle. A range of the rotating angle of the link member 10 is 0° through 60°. However, the range of the rotating angle may be properly determined to be fit for regulation requirements in various nations, by changing the design of the fan shaped grooves 51 and the stoppers 53.

The main hinge 70 includes first and second main hinge parts 80 and 90 to rotatably combine opposite sides of the upper end 10b of the link member 10 to the third and fourth supporting brackets 73 and 77, respectively.

The third and fourth supporting brackets 73 and 77 have first ends fastened onto a lower part of the main bracket 170 with the third screws 173. The third and fourth supporting brackets 73 and 77 also have second ends, each provided with second and third frictional springs 84 and 94 which are shaped like a flat spring and to which third and fourth hinge pins 83 and 93 (to be described later) are rotatably inserted with a predetermined friction.

The first main hinge part 80 includes a third pin supporting part 82 formed on a first side of the upper end 10b of the link member 10, and a third hinge pin 83 having a first end fixedly fitted into the third pin supporting part 82. The first main hinge part 80 also includes the second frictional spring 84 incorporated with the third supporting bracket 73 to rotatably accommodate a second end of the third hinge pin 83 therein, with a force resisting rotation of the third hinge pin 83. That is, the third hinge pin 83 is fitted into the third pin supporting part 82 of the link member 10, and rotatably inserted in the second frictional spring 84 incorporated with the third supporting bracket 73 with a predetermined friction.

The second main hinge part 90 includes a third pin accommodating part 91 formed on a second side of the upper end 10b of the link member 10, a second link supporting part 95 provided between the opposite sides of the upper end 10a of the link member 10, and a fourth hinge pin 93 having a first end incorporated with the second link supporting part 95 and rotatably inserted in the third pin accommodating part 91. The second main hinge part 90 also includes the third frictional spring 94 incorporated with the fourth supporting bracket 77 to rotatably accommodate a second end of the fourth hinge pin 93 therein, with a force resisting rotation of the fourth hinge pin 83.

The fourth hinge pin 93 is rotatably inserted in the third pin accommodating part 91 of the link member 10, and rotatably accommodated in the third frictional spring 94 incorporated with the fourth supporting bracket 77 with a predetermined friction.

The second link supporting part 95 is provided between the opposite sides of the upper end 10a of the link member 10, and incorporated with the fourth hinge pin 93. The first and second link supporting parts 45 and 95 are linked by auxiliary link members 100 and 110 (to be described later), so that the second link supporting part 95 is rotated together with the auxiliary link members 100 and 110.

Thus, when the monitor main body 120 is tilted against the link member 10 in upward and downward directions, the auxiliary link members 100 and 110 are not rotated and the second link supporting part 95 is also not rotated. Therefore, when the monitor main body 120 is tilted against the link member 10 in the upward and downward directions, only the second and third frictional springs 84 and 94 incorporated with the main bracket 170 are rotated about the third and fourth hinge pins 83 and 93. Herein, it is preferable that the friction between the third hinge pin 83 and the second frictional spring 84, and the friction between the fourth hinge pin 93 and the third frictional spring 94 are stronger than the torque due to the weight of the monitor main body 120.

The second main hinge part 90 includes a tilting angle restricting part 55 to restrict a tilting angle of the monitor main body 120 against the link member 10 within a predetermined range.

The tilting angle restricting part 55 includes an arc cutting part 56 formed by partially cutting the fourth supporting bracket 77 adjacent to the third frictional spring 94. The tilting angle restricting part 55 also includes a tilting restricting washer 57 formed with a washer through hole 58 and fixedly fitted on the fourth hinge pin 83 so as to rotate together with the fourth hinge pin 83, and a projection 59 selectively engaged with opposite ends of the arc cutting part 56 according to a tilting direction of the monitor main body 120.

Figure 9:
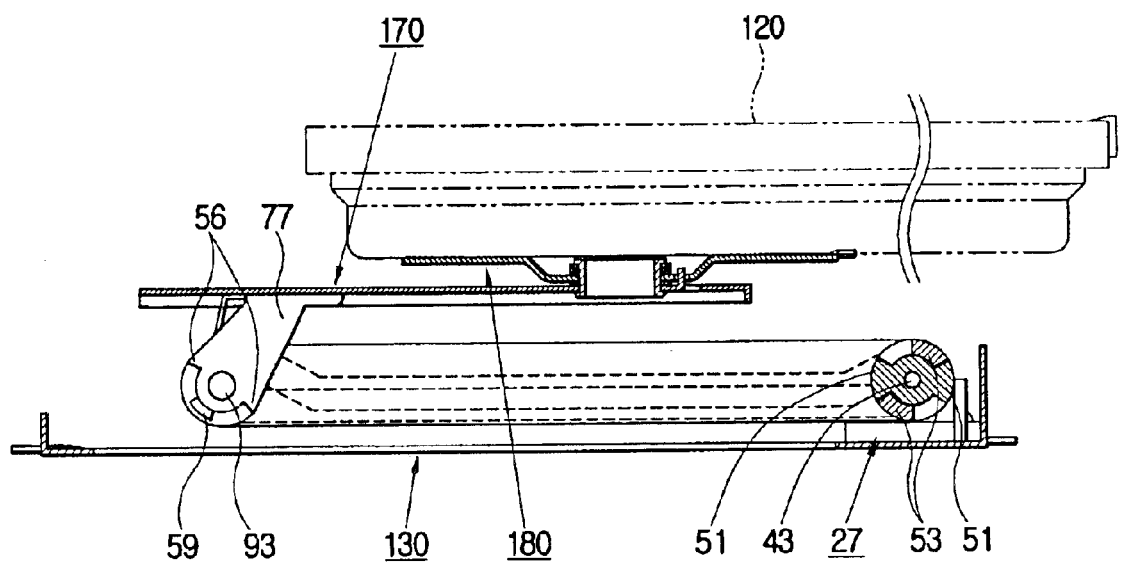
FIG. 9 is a sectional view illustrating a completely folded state of the monitor of FIG. 2.

Thus, the tilting angle of the monitor main body 120 against the link member 10 is restricted within a predetermined angle. However, the monitor main body 120 is tilted in a backward direction against the link member 10, and may be completely laid on the link member 10 (refer to FIG. 9). Further, a range of the tilting angle may be properly determined to be fit for regulation requirements in various nations, by changing the design of the arc cutting part 56 and the projection 59 of the tilting restricting washer 57.

With the above configuration, the link member 10 may be rotated in forward and backward directions against the base member 130, and the monitor main body 120 may be tilted against the link member 10 within a predetermined range. However, the link member 10 and the monitor main body 120 may not be individually rotated, that is, the monitor main body 120 may be tilted at the predetermined angle (like the foregoing restricted tilting angle) by interlocking with the rotation of the link member 10 against the base member 130. To accomplish this structure, the present invention includes the auxiliary link members 100 and 110 to transmit a rotating motion of the link member 10 against the base member 130 to a tilting motion of the monitor main body 120.

The auxiliary link members 100 and 110 are shaped like a long bar, and are rotatably combined to the first and second link supporting parts 45 and 95. In each of the first and second link supporting parts 45 and 95 are provided auxiliary link accommodating parts 46 and 96 to which opposite ends of the auxiliary link members 100 and 110 are inserted. Also, provided in each of the first and second link supporting parts 45 and 95 are a plurality of pin holes 47 an 97 spaced from each other at a predetermined distance to communicate with the auxiliary link accommodating parts 46 and 96. On the opposite ends of the auxiliary link members 100 and 110 are formed through holes 100a and 110a to be aligned with the pin holes 47 and 97, respectively.

Thus, in a state that both ends of the auxiliary link member 100 and 110 are respectively inserted into the auxiliary link accommodating parts 46 and 96 of the first and second link supporting parts 45 and 95, and the through holes 100a and 110a formed on both ends of the auxiliary link member 100 and 110 are respectively aligned with the pin holes 47 and 97 formed on the first and second link supporting parts 45 and 95, the auxiliary link member 100 and 110 are coupled to the first and second link supporting parts 45 and 95 by part of a plurality of link coupling pins 102, respectively. Therefore, the pair of auxiliary link members 100 and 110 moves in parallel with each other.

With the above configuration, in the monitor according to the present invention, the tilt of the monitor main body 120 and the rotation of the link member 10 are controlled as follows.

Figure 7:
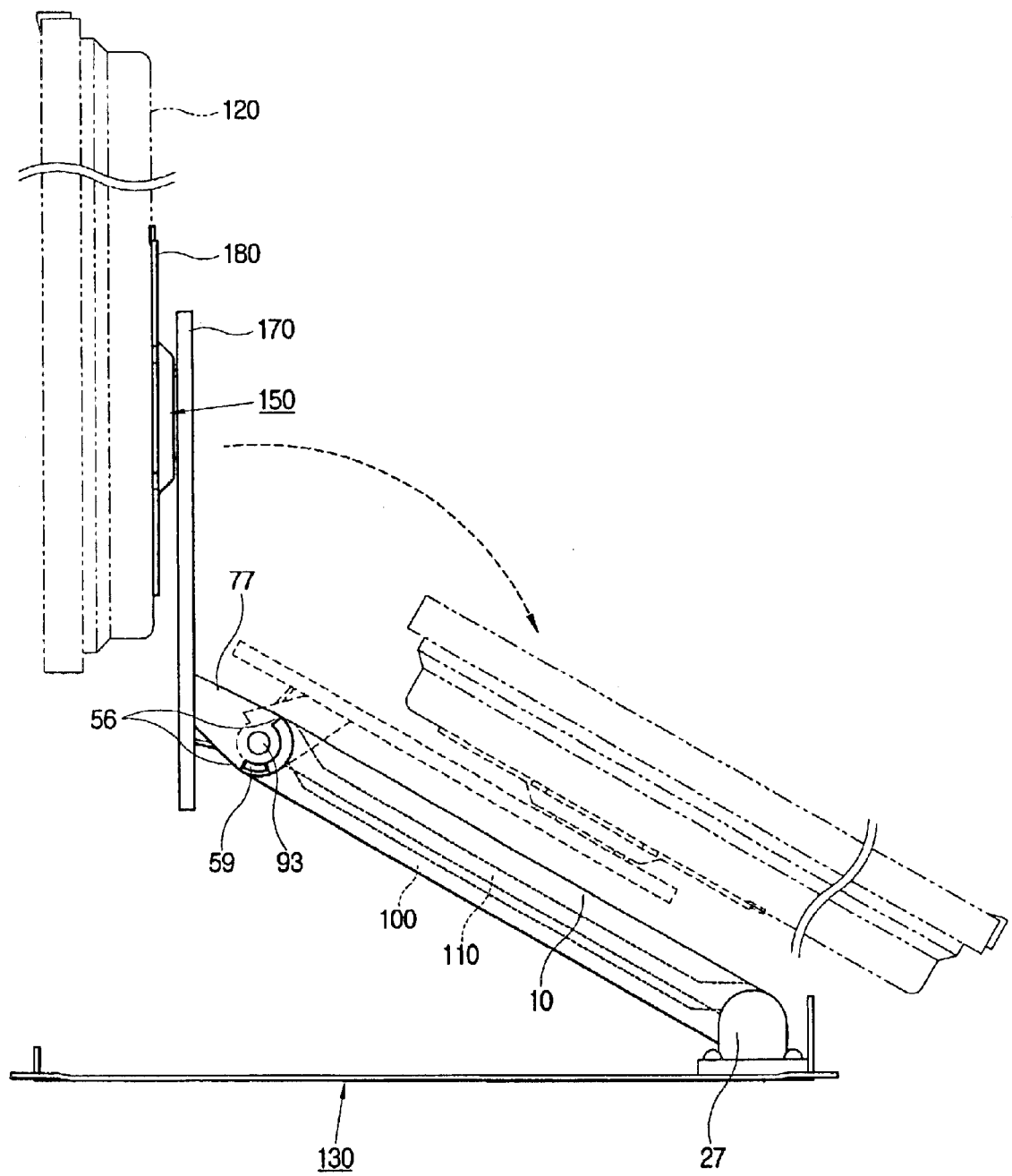
FIG. 7 is a sectional view illustrating a tilting operation of the monitor main body in the monitor of FIG. 2.

In a case where the monitor main body 120 is tilted against the link member 10, as shown in FIG. 7, when the monitor main body 120 is upward and downward pressed enough to overcome the friction between the third hinge pin 83 and the second frictional spring 84, and the friction between the fourth hinge pin 93 and the third frictional spring 94, the second and third frictional springs 84 and 94 incorporated with the main bracket 170 are rotated about the third and fourth hinge pins 83 and 94. Here, the tilting angle of the monitor main body 120 against the link member 10 is restricted within a predetermined angle by part of the arc cutting part 56 of the fourth supporting bracket 77, and the projection 59 of the tilting restricting washer 57 fitted on the fourth hinge pin 93. Further, the monitor main body 120 is tilted in the backward direction against the link member 10, and may be completely laid on the link member 10 (refer to FIG. 9).

Figure 8A:
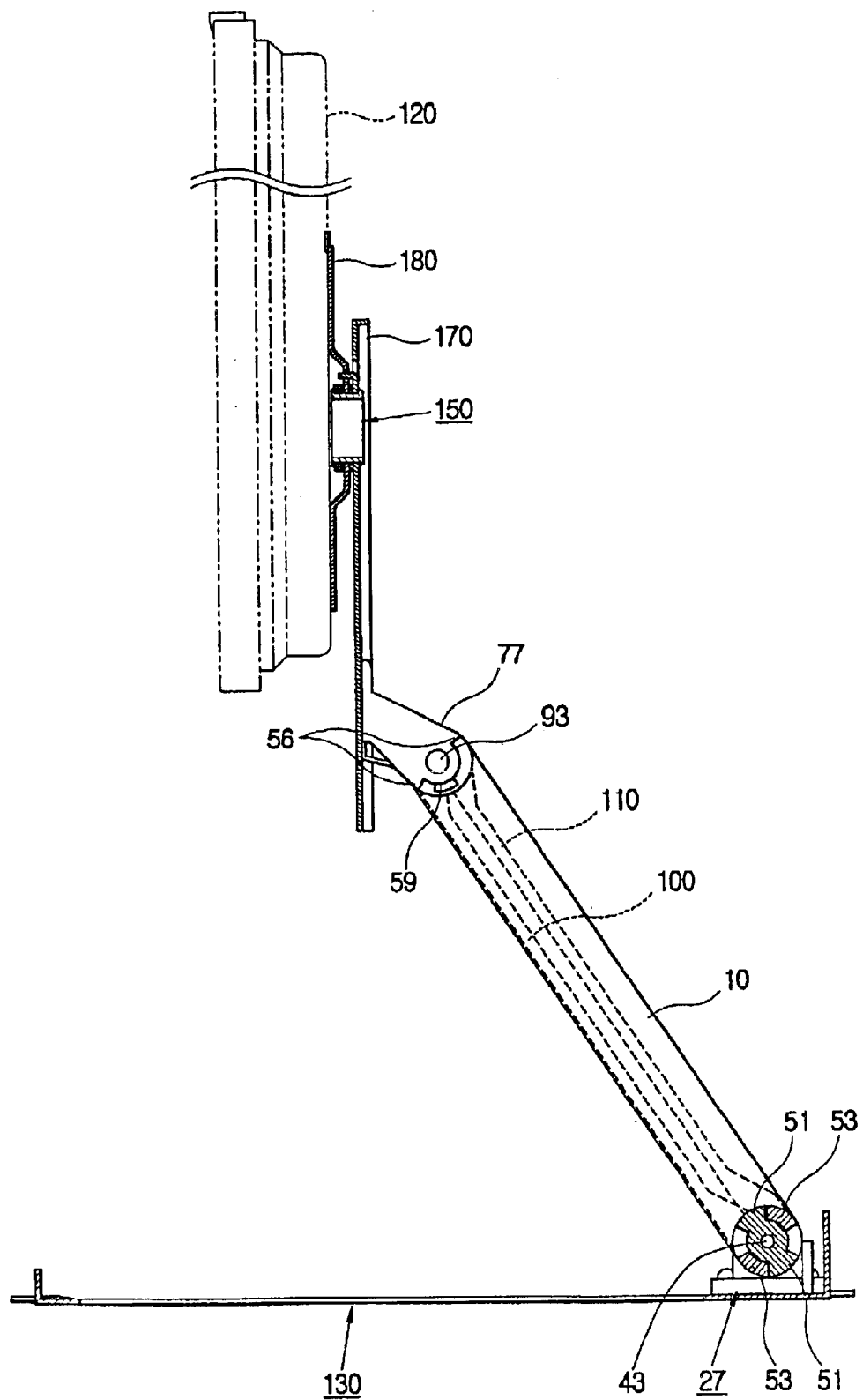
FIGS. 8A and 8B are sectional views illustrating a rotating operation of a link member in the monitor of FIG. 2.
Figure 8B:
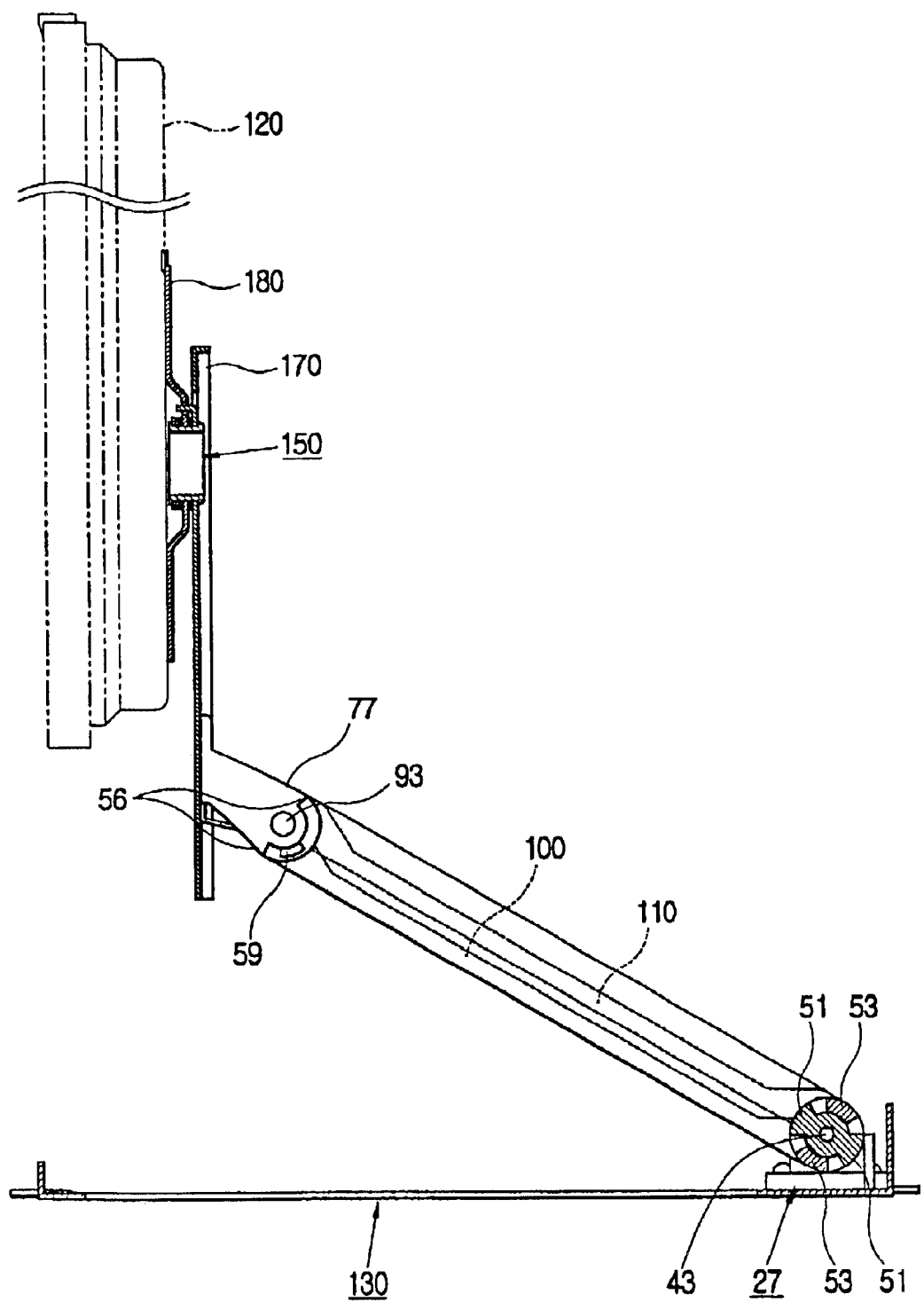

In a case where the link member 10 is forward and backward rotated against the base member 130, as shown in FIGS. 8A and 8B, if the link member 10 is forward pressed, the link member 10 is forward rotated about an axis of the first and second hinge pins 33 and 43 (refer to FIG. 8A). Here, the link member 10 is slowly rotated because of the elasticity of the torsion spring 35 provided on the first base hinge part 30.

According to the forward rotation of the link member 10, the second link supporting part 95 provided between the opposite sides of the upper end 10b of the link member 10 is rotated in a clockwise direction at a predetermined angle by part of the auxiliary link members 100 and 110. Herein, the rotating motion of the second link supporting part 95 is transmitted to the fourth hinge pin 93 and the fourth supporting bracket 77 is rotated together with the fourth hinge pin 93, thereby tilting the monitor main body 120. Herein, the reason that the fourth hinge pin 93 and the fourth supporting bracket 77 work together is that predetermined friction is provided between the fourth hinge pin 93 and the third frictional spring 94 of the fourth supporting bracket 77. Thus, the tilt of the monitor main body 120 against the link member 10 is interlocked with the rotation of the link member 10 against the base member 130, so that the monitor main body 120 is controlled in height while maintaining a tilt position. Further, an interlocking motion between the monitor main body 120 and the link member 10 may be adjusted by changing a length and position of the auxiliary link members 100 and 110.

If the link member 10 is more forwardly pressed, the link member 10 is rotated until one of the fan shaped grooves 51 formed on the lower end 10a of the link member 10 is engaged with one of the stoppers 53 formed on the second supporting bracket 27. Here, the link member 10 is not forwardly rotated anymore. If the monitor main body 120 is downwardly pressed toward the base member 130, the monitor main body 120 may be completely laid on the base member 130 (refer to FIG. 9).

A process of altering the monitor of the present invention from a completely folded state into an unfolded state is performed in reverse to the above.

As described above, because the monitor main body 120 is completely laid on the base member 130, a packing volume of the monitor is decreased, thereby decreasing costs to store and carry the monitor.

Figure 10:
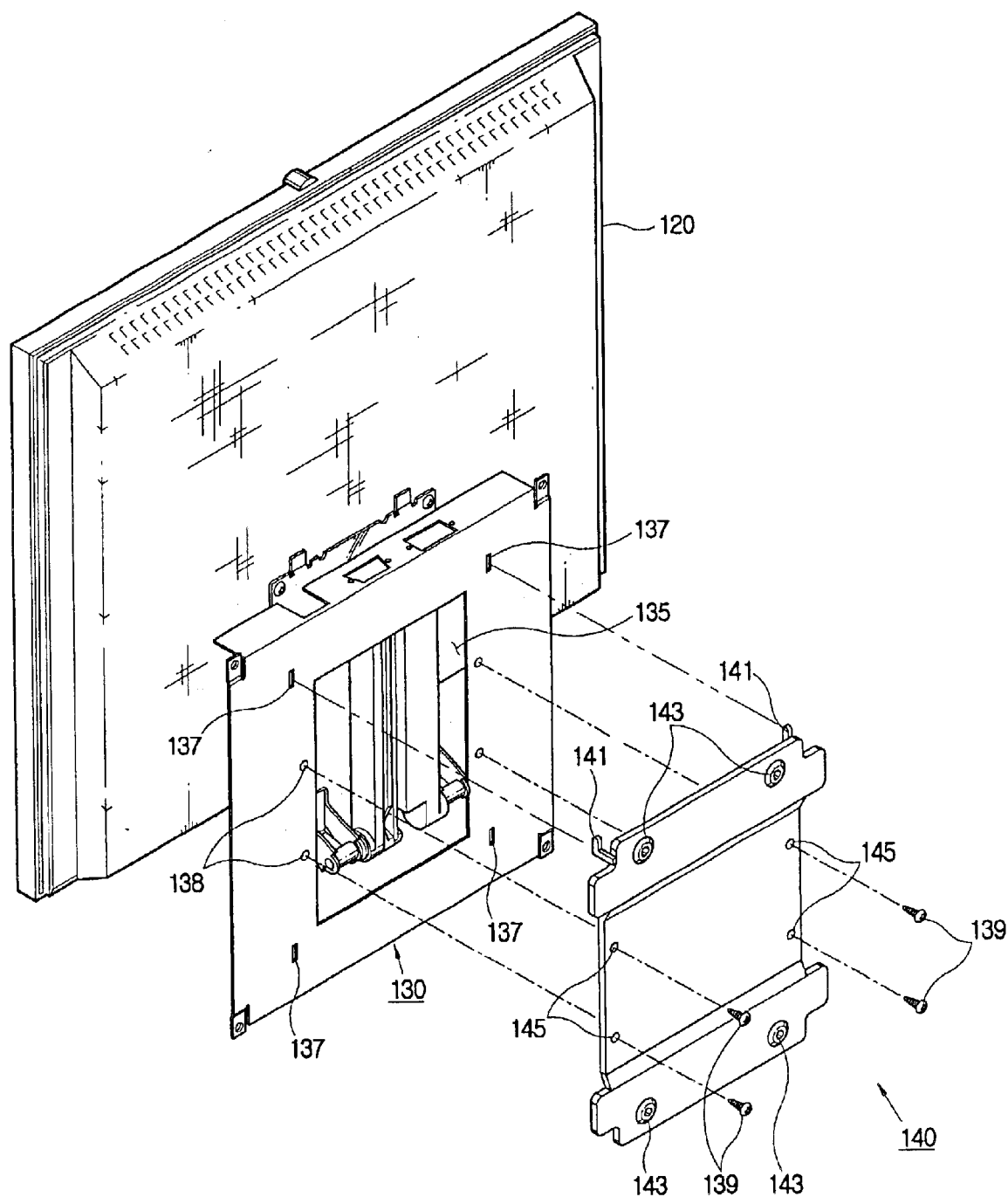
FIG. 10 is a perspective view illustrating a base bracket to be mounted on a base member of the monitor of FIG. 2.

As shown in FIG. 10, the monitor according to the present invention includes a base bracket 140 having one side combined to the rear of the base member 130 and the other side mounted onto an inclined plane including a vertical plane such as the wall, the arm stand, etc.

The base bracket 140 is formed with a plurality of second hooks 141 engaged with a plurality of second hook holders 137 formed on the base member 130 so as to easily deposit the base bracket 140 on the rear of the base member 130. The base bracket 140 is also formed with a plurality of first combining holes 143 employed to combine the base bracket 140 with the inclined plane, and a plurality of second combining holes 145 employed to combine the base bracket 140 with the base member 130. Further, the base member 130 is formed with a plurality of third combining holes 138 in correspondence to the second combining holes 145 of the base bracket 140, so that the base bracket 140 is combined to the base member 130 with a plurality of fourth screws 139.

Herein, the second combining holes 145 of the base bracket 140 and the third combining holes 138 of the base member 130 are formed according to the VESA, so that the monitor may be installed onto various arm stands according to the VESA. Thus, the monitor may be mounted onto the inclined plane.

Figure 11:
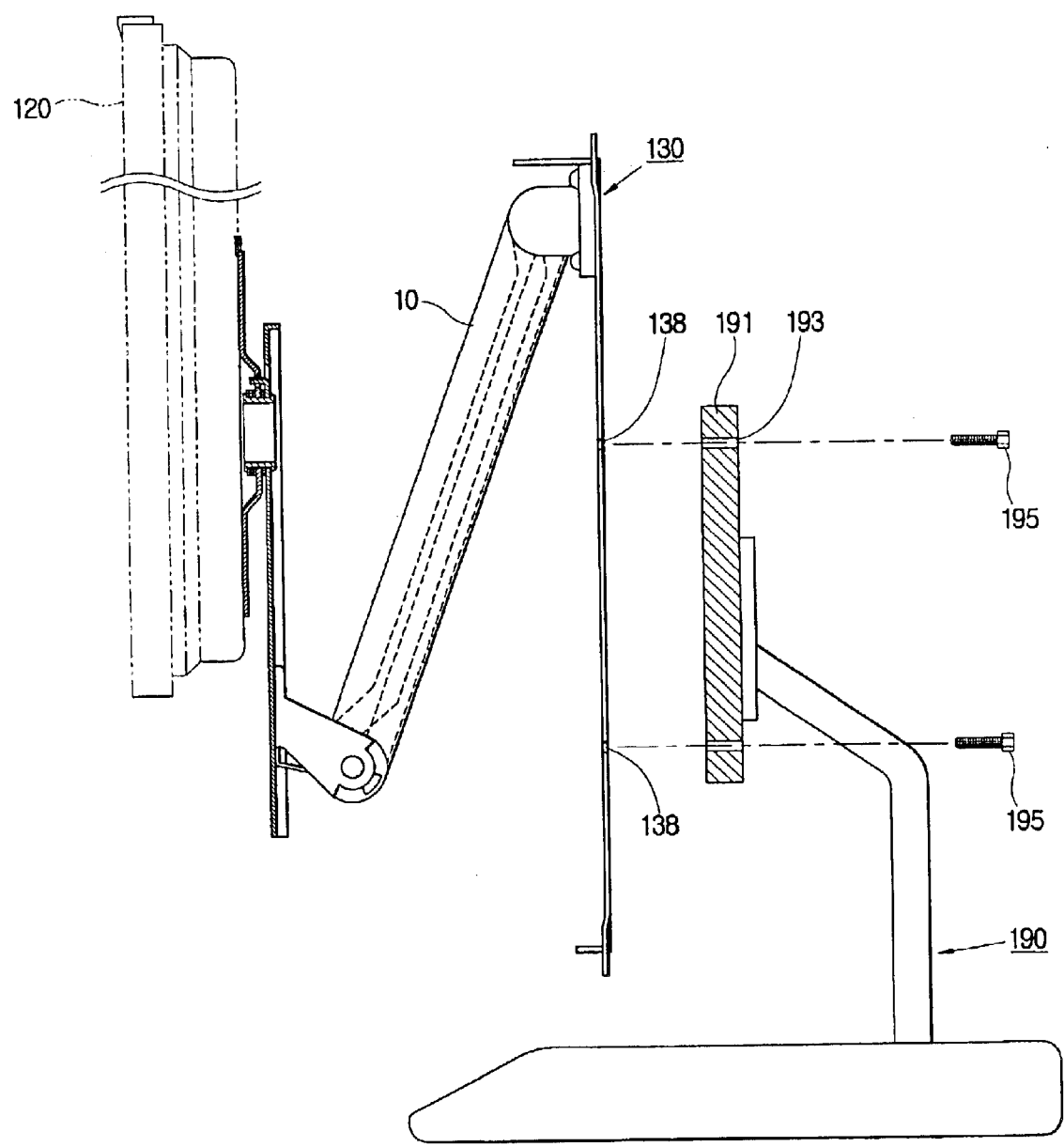
FIG. 11 is a sectional view illustrating the monitor of FIG. 2 to be mounted to an arm stand.

FIG. 11 is a sectional view illustrating the monitor according to the present invention to be mounted to an arm stand. As shown therein, an arm stand 190 is provided with a monitor supporting part 191 at an upper part thereof, and the monitor supporting part 191 is formed with a plurality of fourth combining holes 193 according to the VESA. Therefore, the third combining holes 138 of the base member 130 are aligned with the fourth combining holes 193 of the monitor supporting part 191. Fifth screws 195 are then inserted into the third combining holes 138 formed on the base member 130 at a rear of the monitor supporting part 171 by passing through the fourth combining holes 193 of the monitor supporting part 191. Thus, the monitor may be easily mounted on various arm stands according to the VESA.

In this embodiment, the torsion spring 35 is provided in the first base hinge part 30. However, the torsion spring may be provided in at least one of the first and second base hinge parts.

In this embodiment, the rotating angle restricting part 50 is provided in the second base hinge part 40. However, the rotating angle restricting part may be provided in at least one of the first and second base hinge parts.

In this embodiment, the tilting angle restricting part 55 to restrict the tilting angle of the monitor main body 120 is provided in the second main hinge part 90. However, the tilting angle restricting part may be provided in at least one of the first and second main hinge parts.

As described above, the present invention provides a monitor in which a monitor main body is controlled in tilt, planar rotation, and height, while maintaining tilt position regardless of the height control.

Further, the present invention provides a monitor which properly adjusts a tilting angle of a monitor main body against a base member, and decreases costs to store and carry the monitor by decreasing the packing volume thereof.

Further, the present invention provides a monitor in which a base member is installed onto an inclined plane such as a wall, an arm stand, etc., and more particularly, a monitor which is easily installed onto various arm stands according to VESA.

Although a few embodiments of the present invention have been shown and described, it would be appreciated by those skilled in the art that changes may be made in these embodiments without departing from the principles and spirit of the invention, the scope of which is defined in the appended claims and their equivalents.

What is claimed is:

1. A monitor having a monitor main body to display a picture thereon, and a base member to support the monitor main body, the monitor comprising:

a link member having upper and lower ends rotatably combined to a main hinge provided in the monitor main body and a base hinge provided in the base member, respectively;

an auxiliary link member to connect the main and base hinges and disposed in parallel with the link member, the auxiliary member being eccentric with the main hinge and the base hinge;

a main bracket interposed between the monitor main body and the link member; and a pivot part to pivot the monitor main body about the main bracket.

2. The monitor according to claim 1, further comprising:

a monitor bracket detachably combined to the monitor main body between the monitor main body and the main bracket.

3. The monitor according to claim 1, further comprising:

a base bracket combined to the base member to install the base member onto an inclined plane, wherein the base bracket is provided with at least one second hook engaged with at least one second hook holder provided on the base member to be deposited on a rear of the base member.

4. The monitor according to claim 1, further comprising:
a pair of first and second supporting brackets spaced from each other at a predetermined distance and fastened onto the base member,
wherein the base hinge includes first and second base hinge parts to rotatably combine opposite sides of the lower end of the link member to the first and second supporting brackets, respectively.

5. The monitor according to claim 1, further comprising:
a link member accommodating part provided at a center of the base member to accommodate the link member.

6. The monitor according to claim 1, wherein the monitor main body is tilted in a backward direction against the link member to lay parallel to the link member.

7. The monitor according to claim 1, wherein a tilt of the monitor main body against the link member is interlocked with a rotation of the link member against the base member, so that the monitor main body is controlled in height while maintaining a tilt position.

8. The monitor according to claim 1, wherein the monitor main body is controlled in a tilt position, planar rotation, and height position while maintaining the tilt position regardless of the controlled height position.

9. The monitor according to claim 2, wherein the pivot part connects the monitor bracket to the main bracket.

10. The monitor according to claim 2, wherein the monitor bracket is formed with at least one through hole to be combined to the monitor main body, and a rear of the monitor main body is formed with at least one screw hole in correspondence to the through hole of the monitor bracket.

11. The monitor according to claim 3, wherein the base bracket is provided with at least one first combining hole to combine the base bracket with the inclined plane.

12. The monitor according to claim 3, wherein the base bracket is provided with at least one second combining hole to combine the base bracket with the base member, and the base member is provided with at least one third combining hole in correspondence to the second combining hole of the base bracket.

13. The monitor according to claim 3, further comprising:
an arm stand provided with a monitor supporting part having at least one fourth combining hole designed according to VESA.

14. The monitor according to claim 4, wherein the first base hinge part comprises:
a first pin accommodating part formed on a first side of the lower end of the link member;
a first pin supporting part formed inside the first supporting bracket;
a first hinge pin having a first end rotatably inserted in the first pin accommodating part and a second end fitted into the first pin supporting part; and
a first frictional spring interposed between the first hinge pin accommodating part and the first hinge pin, and having a force resisting rotation of the first hinge pin.

15. The monitor according to claim 4, wherein the first supporting bracket comprises:
a spring supporting part to protrude inwardly, and provided thereon with a torsion spring having an elasticity to act in an opposite direction to a downward rotation of the link member against the base member.

16. The monitor according to claim 4, wherein the second base hinge part comprises:
a second pin accommodating part formed on a second side of the lower end of the link member;
a second pin supporting part formed inside the second supporting bracket;
a second hinge pin having a first end rotatably inserted in the second pin accommodating part and a second end fitted into the second pin supporting part; and
a first link supporting part fixedly fitted into the second supporting bracket, and incorporated with the second end of the second hinge pin.

17. The monitor according to claim 4, wherein at least one of the first and second base hinge parts is provided with a rotating angle restricting part to restrict a rotating angle of the link member against the base member within a predetermined range.

18. The monitor according to claim 4, wherein at least one of the first and second hinge parts is provided with a torsion spring.

19. The monitor according to claim 9, wherein the pivot part comprises:
a first through hole formed through the main bracket;
a second through hole formed through the monitor bracket, and having a protruding part to protrude from a center of the monitor bracket toward the main bracket;
at least one washer provided between the first and second through holes; and
a rivet inserted through the first and second through holes to make the main and monitor brackets pivot against each other with a predetermined friction, and provided with a cable through hole through which a cable electrically connecting the monitor main body and the base member passes.

20. The monitor according to claim 10, wherein the through holes of the monitor bracket and the screw holes of the monitor main body are designed according to Video Electronic Standard Association (VESA).

21. The monitor according to claim 10, wherein the monitor bracket is formed with at least one first hook extended from an edge of the monitor bracket to be easily deposited on a rear of the monitor main body, and a rear of the monitor main body is formed with at least one first hook holder in correspondence to the first hook of the monitor bracket, to reinforce the combination of the through hole of the monitor bracket and the screw hole of the monitor main body.

22. The monitor according to claim 12, wherein the second combining hole of the base bracket and the third combining hole of the base member are designed according to VESA (Video Electronic Standard Association).

23. The monitor according to claim 13, wherein the third combining hole of the base member is aligned with the fourth combining hole of the monitor supporting part to fasten the base member to the monitor supporting part, so that the monitor is mounted to the arm stand.

24. The monitor according to claim 14, wherein the first frictional spring comprises a first end fixed fitted to the first hinge and a second end combined to the first pin accommodating part.

25. The monitor according to claim 15, wherein the torsion spring comprises a first end supported by the first supporting bracket, and a second end supported by the link member, causing a force to act in an opposite direction to a forward rotation of the monitor main body linked to the link member.

26. The monitor according to claim 15, wherein the elasticity of the torsion spring is equal to a torque due to a weight of the monitor main body, allowing the weight and the elasticity to offset each other and rotate the link member against the base member with a small force.

27. The monitor according to claim 16, further comprising:
a pair of third and fourth supporting brackets spaced from each other at a predetermined distance and fastened onto the main bracket,
wherein the main hinge includes first and second main hinge parts to rotatably combine opposite sides of the upper end of the link member to the third and fourth supporting brackets, respectively.

28. The monitor according to claim 19, wherein the pivot part comprises:
a pivoting angle restricting part to restrict a pivoting angle of the monitor bracket on the main bracket.

29. The monitor according to claim 19, wherein the washer allows the friction acting between the main bracket and the monitor bracket to be constant.

30. The monitor according to claim 17, wherein the rotating angle restricting part comprises:
a pair of fan shaped grooves formed on the second side of the lower end of the link member, around the second pin accommodating part, to be opposite each other; and
a pair of stoppers provided around the second pin supporting part of the second supporting bracket and, selectively engaged with the pair of fan shaped groove according to a rotating direction of the link member.

31. The monitor according to claim 28, wherein the pivoting angle restricting part comprises:
a pivot projection provided on one of the main bracket and the monitor bracket; and
a guide slot formed on the other one of the main bracket and the monitor bracket.

32. The monitor according to claim 28, wherein the pivoting angle restricting part comprises:
a pivot projection provided adjacent to one of the first and second through holes; and
a guiding slot shaped like an arc, formed adjacent to the other one of the first and second through holes, to accommodate and guide the pivot projection to restrict sliding of the pivot projection.

33. The monitor according to claim 28, wherein the pivoting angle restricting part comprises:
a pivot projection formed by partially cutting a part of the main bracket adjacent to the first through hole and bending the cut part; and
a guide slot formed on the monitor bracket with an arch shape to be coaxial with and spaced from the second through hole, wherein
the guiding slot accommodates the pivot projections so that the pivoting angle of the pivot projection is restricted within the guiding slot.

34. The monitor according to claim 24, wherein the first frictional spring is fastened to the link member and rotatably combined to the first hinge pin which is fastened to the first supporting bracket, with a predetermined friction.

35. The monitor according to claim 27, wherein the first main hinge part comprises:
a third pin supporting part formed on a first side of the upper end of the link member;
a third hinge pin having a first end fitted into the third pin supporting part; and
a second frictional spring incorporated with the third supporting bracket and to rotatably accommodate a second end of the third hinge pin therein, with a force resisting rotation of the third hinge pin.

36. The monitor according to claim 27, wherein at least on of the first and second main hinge parts is provided with a tilting angle restricting part.

37. The monitor according to claim 27, wherein the second main hinge part comprises:
a tilting angle restricting part to restrict a tilting angle of the monitor main body against the link member within a predetermined range.

38. The monitor according to claim 35, wherein the second main hinge part comprises:
a third pin accommodating part formed on a second side of the upper end of the link member;
a second link supporting part provided between the opposite sides of the upper end of the link member;
a fourth hinge pin having a first end incorporated with the second link supporting part and rotatably inserted in the third pin accommodating part; and
a third frictional spring incorporated with the fourth supporting bracket and to rotatably accommodate a second end of the fourth hinge pin therein, with a force resisting rotation of the fourth hinge pin.

39. The monitor according to claim 38, wherein a rotating motion of the second link supporting part is transmitted to the fourth hinge pin, and the fourth supporting bracket is rotated together with the fourth hinge pin, thereby tilting the monitor main body.

40. The monitor according to claim 34, wherein the predetermined friction is stronger than a torque due to a weight of the monitor main body.

41. The monitor according to claim 37, wherein the tilting angle restricting part comprises:
an arc cutting part formed on the fourth supporting bracket adjacent to the third frictional spring; and
a tilting restricting washer formed with a washer through hole and fixedly fitted on the fourth hinge pin, and a projection selectively engaged with opposite ends of the arc cutting part according to a tilting direction of the monitor main body, wherein
the tilting angle of the monitor main body against the link member is restricted within a predetermined range.

42. The monitor according to claim 38, wherein the auxiliary link member is provided in pairs and is rotatably combined to the first and second link supporting parts.

43. The monitor according to claim 42, wherein the first and second link supporting parts are provided with a plurality of pin holes spaced from each other at a predetermined distance, and on opposite ends of the auxiliary link members are provided pin through holes to be aligned with the pin holes.

44. The monitor according to claim 42, wherein the first and second link supporting parts are linked by the auxiliary members, so that the second link supporting part is rotated together with the auxiliary link members.

45. The monitor according to claim 42, wherein when the monitor main body is tilted against the link member in upward and downward directions, the second and third frictional springs are rotated about the third and fourth hinge pins, preventing the auxiliary members and the second link supporting part from rotating.

46. The monitor according to claim 42, wherein the auxiliary members transmit a rotating motion of the link member against the base member to a tilting motion of the monitor main body.

47. The monitor according to claim 41, wherein a range of the tilting angle is determined by a design of the arc cutting part and the projection of the tilting restricting washer.

48. The monitor according to claim 43, further comprising:

a plurality of link coupling pins inserted through the pin holes of the first and second link supporting parts and the pin through holes of the auxiliary link members to couple the auxiliary link members with the first and second link supporting parts.

49. The monitor according to claim 45, wherein a friction between the third hinge pin and the second frictional spring, and a friction between the fourth hinge pin and the third frictional spring are stronger than torque due to a weight of the monitor main body.

50. A monitor having a monitor main body to display a picture thereon, and a base member to support the monitor main body, the monitor comprising:

a link member rotatably combined to a main hinge provided in the monitor main body and a base hinge provided in the base member;

an auxiliary link member to connect the main and base hinges, and disposed in parallel with the link member;

a main bracket interposed between the monitor main body and the link member;

a monitor bracket detachably combined to the monitor main body between the monitor main body and the main bracket; and a pivot part to connect the monitor bracket upon the main bracket, and to pivot the monitor main body upon the main bracket.

51. A monitor having a monitor main body to display a picture thereon, and a base member to support the monitor main body, the monitor comprising:

a link member rotatably combined to a main hinge provided in the monitor main body and a base hinge provided in the base member;

an auxiliary link member to connect the main and base hinges, and disposed in parallel with the link member;

a main bracket interposed between the monitor main body and the link member;

a monitor bracket detachably combined to the monitor main body between the monitor main body and the main bracket;

a pivot part to connect the monitor bracket upon the main bracket, and to pivot the monitor main body upon the main bracket; and a base bracket combined to the base member to install the base member onto an inclined plane.

* * * * *